March 13, 1945.　　　E. S. WESSBORG　　　2,371,325
BRAILLE TEACHING DEVICE
Filed March 31, 1941
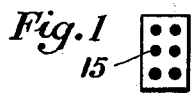
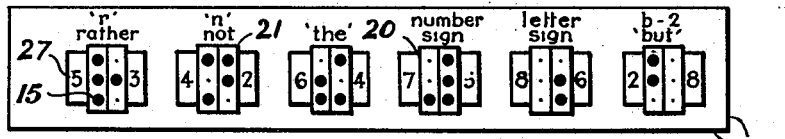
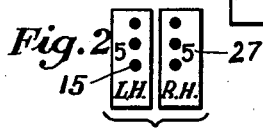
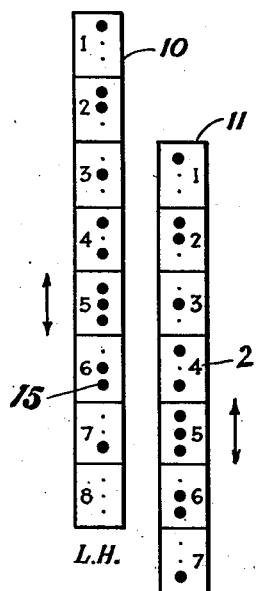
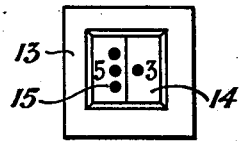
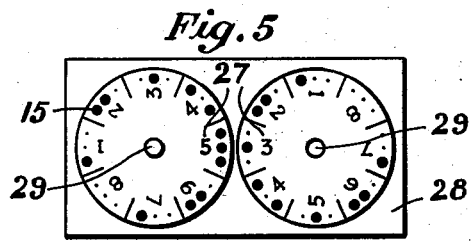
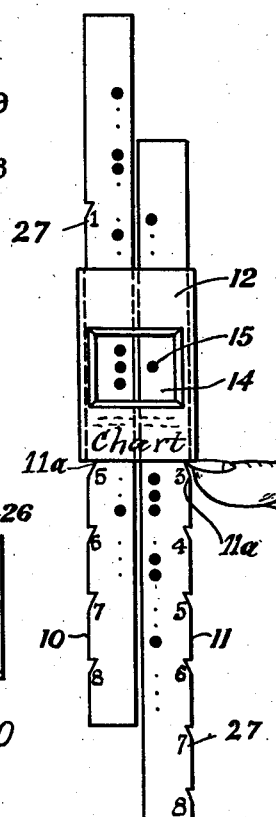
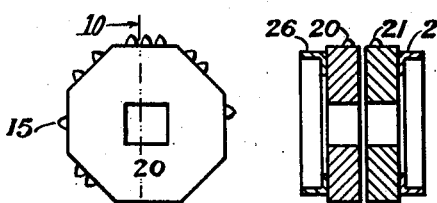
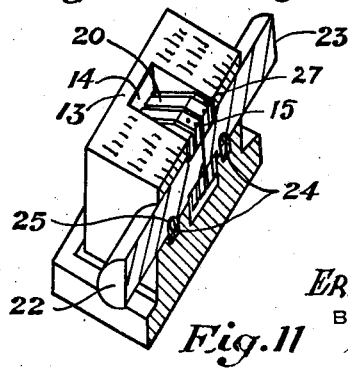
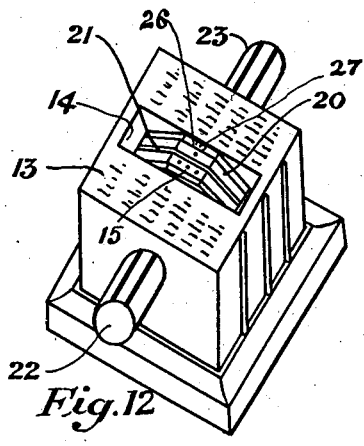
INVENTOR
ERIC S. WESSBORG
BY George B. Willcox
ATTORNEY.

Patented Mar. 13, 1945

2,371,325

UNITED STATES PATENT OFFICE 2,371,325

BRAILLE TEACHING DEVICE

Eric S. Wessborg, Saginaw, Mich.

Application March 31, 1941, Serial No. 386,014

8 Claims. (Cl. 35—38)

This invention relates to improvements in devices to facilitate teaching Braille to the blind.

For purposes of description the present improvement may be regarded as carrying forward and developing in a new and inventive sense certain ideas employed in Patent No. 1,998,063, issued to me April 16, 1935, for Printing apparatus and types, wherein is disclosed and claimed a means for taking notes, writing letters and printing books in Braille. That invention is intended to be used by blind persons who are familiar with Braille.

The present improvement has for its objects: to provide a simplified, relatively inexpensive apparatus the function of which is to assist in teaching the elements of Braille to blind beginners; to enable seeing persons, even those who can not themselves read or write Braille, to teach blind beginners the rudiments of that system; to lessen the mental effort and reduce the anxiety and feelings of uncertainty heretofore experienced by many blind beginners during the early stages of their learning period; to shorten the time required for a novice to learn the alphabetic and other symbols of Braille.

With the foregoing and certain other objects in view which will be set forth in the specifications, my invention comprises the devices described and claimed and the equivalents thereof.

In the drawing,

Fig. 1 shows a conventional Braille cell of six dots;

Fig. 2 shows the six dot cell divided vertically;

Fig. 3 shows schematically two typical strips which are illustrative of the strips used in one of the preferred embodiments of my invention, being independently movable in the direction of their length, each bearing eight facets, with a designating numeral for each facet; the strips are shown spaced apart for purposes of description, their associated connecting parts being omitted.

Fig. 4 shows various items from a conventional "alphabet chart for Braille grade one-and-a-half," each item being made up of two facets, an identifying numeral being associated with each facet;

Figs. 5 and 6 are, respectively, plan and sectional views of a fractional part only of an apertured plate through which is exhibited one Braille symbol "r" composed of two adjacent semi-symbols, numbers 5 and 3;

Fig. 7 is a face view of an implement employing two sliding strips as in Fig. 3;

Fig. 8 shows schematically two members of a modified type comprising revolvable disks each bearing Braille semi-symbols and a visual identifying mark associated with each semi-symbol; associated connecting parts being omitted;

Fig. 9 is a further modified form of the facet mountings;

Fig. 10 is a sectional view on line 10—10 of Fig. 9;

Fig. 11 is an isometric sectional view of a housing and wheel assembly, being a further modified embodiment of the invention; and Fig. 12 is an isometric view, showing the complete device.

The six embossed dots of a Braille cell, Fig. 1, are used in various combinations to represent printed characters, letters, punctuations, composition signs, etc. For my present purpose, as in the patent alluded to, such a cell is divided vertically to present two facets, left-hand and right-hand, Fig. 2.

In Fig. 3 the left-hand series of eight facets shows the possible combinations that can be made from the three left-hand Braille cell dots, Fig. 1, plus one blank. The right-hand series of eight facets, Fig. 3, is similarly made up.

By arranging a right-hand and left-hand facet side-by-side any Braille character can be formed.

The right-hand and left-hand series of facets may be on two parallel strips of suitable material, 10, 11 illustrated in Fig. 3. The strips 10 and 11 are shiftable endwise relatively to each other as indicated by the arrows to bring any left-hand and right-hand facets into conjunction, and are preferably mounted for adjustment endwise in a housing 12, Fig. 7, as will be explained later.

It should be noted that Fig. 3 and also Fig. 8 are schematic views of pairs of facet-bearing members that can be moved relatively to each other to produce the various Braille symbols. In Fig. 3 such members are strips 10 and 11; and in Fig. 8 the members are disks 17 and 18 with Braille symbols on their adjacent peripheries. In both Figs. 3 and 8 the mountings or connections employed with the strips and disks are omitted for the sake of clarity. Fig. 7 shows strips like those of Fig. 3 installed in the housing and equipped with notches 11a, by which the finger of the operator, shown at the right in Fig. 7, is employed to shift the semi-symbols so as to arrange them in juxtaposition.

Assigned to each facet is a suitable identifying symbol, 27, such as the numerals 1 to 8. Symbol 5, for example, may identify a facet having three Braille dots in a vertical row, and symbol 3 may identify a facet having one central dot. By combining the left-hand three-dot facet with the right hand one-dot facet, Figs. 3 to 9, the Braille symbol for the letter "r" or the two whole word "rather" is composed. Letter "n" and the word "not" are made, Fig. 4, by combining facets bearing the identifying symbols 4 and 2, thus 42. Word "the" is formed by placing facets bearing 6 and 4 together. The "number sign" may be identified by 75, and the "letter sign" by 86, where the numeral 8 designates a blank facet. Any other appropriate visual symbol to identify each facet of the system may be substituted for the numerals 1–8, 1–8, if desired.

Figs. 5, 6, 11, and 12 show a face-plate 13 with an opening 14 in which the selected pair of facets is framed. The sides of opening 14 are so related to the dots on the facts as to indicate the limits of the cell; that is to say, the face-plate 13 prevents the finger of the user from coming into contact with any dots except those that are exposed through the opening.

In Fig. 6, for instance, the user puts his finger through the opening 14, but in Figs. 12 and 13, where the facets and dots 20, 21, project up through the opening 14 in face-plate 13, the user's finger, in passing over the surface of the plate, will encounter the dots of the exposed Braille symbol and can not feel any other dots. In both cases, Figs. 8 and 12, the housing has an opening through which to show any two preselected semi-symbols that together compose a Braille symbol; and in both cases the Braille character is read through the opening in the face plate. In use, a seeing person, knowing that facets bearing 5 and 3 designate "r" merely moves the facets marked 5, 3 into the face-plate opening 14 to produce "r" in Braille.

A tabulated index chart, of which a typical portion is shown in Fig. 4, within the border lines 28 is provided for the use of seeing persons (even those who do not know Braille) who may act as teachers for blind beginning pupils. It comprises a standard Braille symbol card, preferably bearing dot formations for each Braille symbol, letter, punctuation mark, number, etc. Associated with each such Braille letter or figure on the card is imprinted two of the identifying symbols corresponding to a pair of facets. For example, adjacent the letter "r" on the index chart there is printed the number 53, showing that the letter "r" is to be composed by placing facets bearing 5 and 3 side by side. The seeing person accordingly moves facets 5 and 3 into position in the window opening 14 of plate 13 soon learns to identify the letter "r." Any other letter, such as "n" is similarly set up, using, for instance, index symbol 42. Braille "dots" may be omitted from the chart. The various lines designate in each item shown in Fig. 4, the wheels 20, 21, with dots 15, and the flanges 26 bearing the numerals 2 to 8, all of which are also shown in detail in Figs. 9, 10 and 12. Their purpose is to aid the seeing operator in comparing the setting of the actual device Fig. 12 with the proper item shown in the chart, Fig. 4.

Preferably, the dots or projections 15 on the facets are of hard material such as metal or plastic, and are strongly backed so that a piece of paper 16 placed across the opening 14, Fig. 6, can be pressed down upon the dots with the finger to produce a regular Braille embossment of the letter. Then the blind pupil can by touch compare his embossed production with the same letter in a book of standard Braille printing. Thus he is helped to memorize letter after letter in his own way, even without the verbal instructions which sometimes are so confusing to a blind person who for the first time is confronted with the task of learning Braille. He is, to a considerable degree relieved of mental anxiety and distress. The easy and natural approach to the Braille alphabet gives him self-confidence, simplifies his mental processes, avoids confusion and helps him to learn the elementary Braille symbols in much shorter time than was possible heretofore.

In the foregoing description the facets identified by numerals 1 to 8 have been referred to as being embossed on straight bars or strips 10, 11, that are movable lengthwise relatively to each other in a housing 12. For convenience in "setting up" a Braille character as "r," Fig. 7, finger nail notches 11a are provided in the edges of the strips, each notch bearing an appropriate numeral, as 5, or 3. But any other shiftable means may be used to arrange the facets in pairs.

The right- and left-hand parts of a Braille character may be embossed on two disks 17, 18 that are adapted to revolve relatively to each other, as is indicated in Fig. 8, where 28 designates a base and 29, 29 are pivots on the base for the disks 17, 18. In use, the seeing person desiring to set up the symbol 5—3 designating the word "rather" and the letter "r," will place the proper identifying symbols 27 (namely, 5 and 3) together, as shown in Fig. 8. The blind person in practicing to identify the Braille letter "r" will place his finger on the adjacent parts of the two disks 17, 18 and learns to read the three dots on the left and the single dot in the right.

A still further modified form of facet identifying and adjusting mechanism is based on the use of polygonal wheels in pairs, somewhat as shown in Patent 1,998,063. This modification will now be explained, having reference to Figs. 9 to 12 inclusive.

Two polygonal wheels 20, 21 are arranged side by side in a coacting pair in a housing. Each wheel is mounted so it can be rotated independently of the other. The facets of the two wheels have assortments of Braille "dots" or projections and blanks, omitted from Figs. 11 and 12, arranged so that by manually revolving the two wheels by means of stub shafts 22, 23, any desired character in Braille may be formed and exposed through an opening in the face of the housing.

Spring-actuated detents 24 and matching recesses 25 in the shafts 22, 23 are provided for releasably locating selected facets of the two wheels in a common plane at the top of the housing; rendering it easy for blind operators who know Braille to finger over the top face or plate 13 of the housing and thus read the Braille character through opening 14.

In the device of Figs. 11 and 12, as also, if desired, in Fig. 7, a suitable Braille chart with facet identifying numerals may be printed in ink on plates 13 or 12, for the convenience of the seeing teacher. Each wheel 20, 21 may have a flange extension 26 bearing the identifying digit or code mark of the adjacent facet.

For pupils of Braille shorthand the reference chart used by the seeing teacher may be made up of words instead of letters and numerals, each word on the chart bearing two facet indexing marks—for example, digits 5, 3 may indicate a pair of facets that produce in Braille the word "rather" whereas in the example previously given, they designated the letter "r."

In the foregoing description and in the following claims the use of certain terms may be explained as follows:

By "members" is meant the strips 10, 11 of Figs. 3 and 7, the disks 17, 18 of Fig. 8, the wheels 20 of Figs. 9 to 12, or the equivalents of such illustrative parts.

By "semi-symbols" is meant the right-hand portion or the left-hand portion of a Braille cell such as shown in Fig. 2, a complete Braille symbol being made up of the two semi-symbols in matching position side by side as shown, for example, in Figs. 5 and 7.

By "visual identification mark" is meant a typed or printed numeral or mark to be read by sight, as distinguished from raised Braille characters to be read by touch. Such identifying marks need not necessarily be numerals 1 to 8 as shown in Figs. 3 and 7, but may be any suitable arbitrary marks other than numerals.

The "visual identifying mark" may be associated with its semi-symbol in any suitable way. For example, it may be printed on the facet along with the semi-symbol, as the numeral 5 is printed on the facet adjacent the three dots in Figs. 3, 5, 8; or printed adjacent the notches, Fig. 7, which serve to locate their corresponding semi-symbols in the opening 14 when brought into register with the lower end of face plate 12. The visual numerals may also be printed on the rims of the flanges 26 shown in Figs. 10 to 12.

The term "facet" as used herein is not limited to areas mounted in different planes such as are shown in Fig. 12, but include areas in the same plane, either separated by lines as in Fig. 3, or without dividing lines, as in Fig. 7.

Having thus described my invention, what I claim and desire to secure by Letters Patent is:

1. A device for use in teaching elementary Braille wherein two members present areas bearing semi-symbols in embossed Braille dots, said members being shiftable within a housing to bring any two pre-selected semi-symbols into alinement side by side to form a complete Braille symbol; there being a visual identification mark associated with each of said areas and means for temporarily preventing shifts of said members.

2. A device for use in teaching elementary Braille wherein two members present areas bearing semi-symbols in Braille, said members being shiftable within a housing to bring into alinement any two pre-selected semi-symbols that together compose a complete Braille symbol; having in combination, a visual identification mark associated with each semi-symbol, and a visually readable co-ordinating chart, comprising a series of alphabetical or like characters to be translated into Braille, two imprints of the above mentioned visual semi-symbol identification marks being shown adjacent each such alphabetical character.

3. A device for use in teaching elementary Braille wherein two strips present areas bearing semi-symbols in Braille, said strips being shiftable endwise in a housing having an opening to show in alinement any two pre-selected semi-symbols that together compose a complete Braille symbol, there being a visual identification mark associated with each semi-symbol on each strip to direct the selective shifting of said strips.

4. A device for use in teaching elementary Braille wherein two adjacent strips present areas bearing semi-symbols in Braille, said strips being shiftable endwise in a housing having an opening to expose in alinement for reading by touch two pre-selected semi-symbols that together compose a complete Braille symbol; having in combination notches in the outer edges of said strips, visually readable identification marks on each strip adjacent said notches, and a co-operating abutment on the housing.

5. A structure as set forth in claim 1 wherein the shiftable members comprise a pair of polygonal wheels rotatable in a housing; and a stub shaft for rotating each wheel independently of the other.

6. A device for use in teaching Braille wherein two members present areas bearing semi-symbols in Braille, said members being shiftable in a housing to bring into alignment two pre-selected semi-Braille symbols that together compose a complete Braille symbol; a visual identification mark imprinted on each of said areas and associated with an appropriate semi-symbol for directing the shifting of said semi-symbols selectively into register with an aperture in a wall of said housing.

7. In a device for aiding seeing persons unfamiliar with Braille characters to teach elementary Braille to the blind, a pair of shiftable members each provided on its front face with facets certain of which bear raised semi-symbols in Braille, and also provided with means for locating side-by-side in alinement any two selected facets whose semi-symbols together form a complete Braille character; visual symbols on the front face of each shiftable member, each symbol designating a certain facet on said member, and a face plate having an opening through which said two selected semi-symbols are exposed for simultaneous reading by touch.

8. In a device for aiding seeing persons unfamiliar with Braille characters to teach elementary Braille to the blind, a pair of shiftable members each provided on its front face with facets certain of which bear raised semi-symbols in Braille, and also provided with means for locating side-by-side in alinement any two selected facets whose semi-symbols together form a complete Braille character; visual symbols on the front face of each shiftable member, each symbol designating a certain facet on said member; a face plate having an opening through which said two selected semi-symbols are exposed for simultaneous reading by touch.

ERIC S. WESSBORG.